(12) United States Patent
Klein

(10) Patent No.: US 9,435,680 B2
(45) Date of Patent: Sep. 6, 2016

(54) APPARATUSES AND METHODS FOR FUEL LEVEL SENSING

(71) Applicant: Deringer-Ney, Inc., Bloomfield, CT (US)

(72) Inventor: Arthur S. Klein, Orange, CT (US)

(73) Assignee: DERINGER-NEY, INC., Bloomfield, CT (US)

( * ) Notice: Subject to any disclaimer, the term of this patent is extended or adjusted under 35 U.S.C. 154(b) by 358 days.

(21) Appl. No.: 14/222,963

(22) Filed: Mar. 24, 2014

(65) Prior Publication Data

US 2015/0268087 A1     Sep. 24, 2015

(51) Int. Cl.
*G01F 23/72* (2006.01)

(52) U.S. Cl.
CPC ..................... *G01F 23/72* (2013.01)

(58) Field of Classification Search
CPC ....................................... G01F 23/72
See application file for complete search history.

(56) References Cited

U.S. PATENT DOCUMENTS

| | | |
|---|---|---|
| 254,764 A | 3/1882 | Fox |
| 260,623 A | 7/1882 | Starr |
| 266,911 A | 10/1882 | Starr |
| 515,970 A | 3/1894 | Ries |
| 736,297 A | 8/1903 | Reed |
| 1,036,304 A | 8/1912 | Misland |
| 1,232,450 A | 7/1917 | Misland |
| 1,602,671 A | 10/1926 | Henderson |
| 1,610,591 A | 12/1926 | Redman |
| 2,564,416 A | 8/1951 | Wildhack |
| 2,627,178 A | 2/1953 | Hayward et al. |
| 2,710,898 A | 6/1955 | Greene |
| 2,713,150 A | 7/1955 | Bearinger |
| 3,134,045 A | 5/1964 | Shulman et al. |

(Continued)

FOREIGN PATENT DOCUMENTS

| | | |
|---|---|---|
| EP | 1291623 A1 | 3/2003 |
| EP | 1407236 B1 | 5/2005 |

(Continued)

OTHER PUBLICATIONS

PCT International Search Report for PCT/US2015/019600, mailed Jun. 2, 2015, pp. 1-4.

(Continued)

*Primary Examiner* — Hezron E Williams
*Assistant Examiner* — David Z Huang
(74) *Attorney, Agent, or Firm* — Dorsey & Whitney LLP; Bridget M. Hayden, Esq.

(57) ABSTRACT

Apparatuses and methods for fuel level sensing are described herein. An example sensor includes a sealed housing comprising a first end, a second end, and an interior defined by walls extending therebetween. The sensor includes a float surrounding an exterior of the sealed housing and is configured to move longitudinally along the sealed housing between the first end second ends. The float may include a magnetic element configured to provide a magnetic field. The sealed housing may include an electrically conductive spring coupled to at least one of the first end or the second end, and may include a ferrous element coupled to the electrically conductive spring and configured to be displaced relative to the sealed housing based on the magnetic field. The electrically conductive spring may expand and retract to adjust a resistance of the electrically conductive spring in response to the ferrous element being displaced.

15 Claims, 6 Drawing Sheets

(56) References Cited

U.S. PATENT DOCUMENTS

| | | | |
|---|---|---|---|
| 3,629,774 A * | 12/1971 | Crites | H01C 10/106 |
| | | | 219/528 |
| 3,774,449 A | 11/1973 | Carol, Jr. | |
| 3,925,747 A | 12/1975 | Woodward et al. | |
| 4,107,998 A | 8/1978 | Taylor | |
| 4,532,491 A | 7/1985 | Rau et al. | |
| 4,589,282 A * | 5/1986 | Dumery | G01F 23/72 |
| | | | 324/204 |
| 4,723,446 A * | 2/1988 | Saito | G01B 7/02 |
| | | | 324/207.17 |
| 4,831,878 A | 5/1989 | Hayashi et al. | |
| 4,928,526 A | 5/1990 | Weaver | |
| 5,059,939 A | 10/1991 | Wu | |
| 5,247,834 A | 9/1993 | Woss | |
| 5,666,851 A | 9/1997 | Bacon | |
| 6,401,533 B1 | 6/2002 | Gier et al. | |
| 6,681,628 B2 | 1/2004 | Sawert et al. | |
| 7,315,165 B2 | 1/2008 | Kleinen et al. | |
| 7,621,182 B2 | 11/2009 | Chen | |
| 2003/0066229 A1 | 4/2003 | Chu | |
| 2006/0016256 A1 | 1/2006 | Bauerle et al. | |
| 2009/0038395 A1 | 2/2009 | Roth et al. | |
| 2011/0005312 A1* | 1/2011 | Hopper | G01F 23/0046 |
| | | | 73/313 |
| 2012/0174398 A1* | 7/2012 | Rust | H01R 13/33 |
| | | | 29/876 |
| 2012/0186341 A1 | 7/2012 | Oike et al. | |
| 2013/0055807 A1 | 3/2013 | Cochran et al. | |
| 2013/0146604 A1 | 6/2013 | Moreno et al. | |
| 2014/0096603 A1* | 4/2014 | Nichols | G01F 23/30 |
| | | | 73/305 |

FOREIGN PATENT DOCUMENTS

| | | |
|---|---|---|
| EP | 1983313 A2 | 10/2008 |
| EP | 2216633 A1 | 8/2010 |
| EP | 1312898 A2 | 7/2011 |
| EP | 1821081 B1 | 10/2012 |
| FR | 2526765 | 11/1983 |
| FR | 2633392 A1 | 12/1989 |
| FR | 2975487 A1 | 11/2012 |
| GB | 905226 | 9/1962 |
| GB | 1558250 A | 12/1979 |
| GB | 2187847 A | 9/1987 |
| JP | S60185123 A | 9/1985 |
| JP | 62-140030 A | 6/1987 |
| KR | 20110101932 A | 9/2011 |
| SU | 881523 B | 11/1981 |
| WO | 01/45213 A1 | 6/2001 |
| WO | 2005/057138 A2 | 6/2005 |
| WO | 2006132494 A1 | 12/2006 |

OTHER PUBLICATIONS

PCT International Search Report for PCT/US2015019607, mailed Jun. 9, 2015, pp. 1-5.
PCT Written Opinion for PCT/US2015/019600, mailed Jun. 2, 2015, pp. 1-7.
PCT Written Opinion for PCT/US2015/019607, mailed Jun. 9, 2015, pp. 1-7.
Smith III, E. et al., "Design Guidelines for Automotive Fuel Level Sensors", "Design Guidelines for Automotive Fuel Level Sensors" Paper No. 2002-01-1074; Society of Automotive Engineers, Inc. 2002. (9 pages).
PCT Search Report for PCT/US2015/019605, mailed Jun. 29, 2015, pp. 1-5.
PCT Written Opinion for PCT/US2015/019605, mailed Jun. 29, 2015, pp. 1-8.

\* cited by examiner

APPARATUSES AND METHODS FOR FUEL LEVEL SENSING

TECHNICAL FIELD

Examples of the present invention relate generally to fuel level sensors, and more particularly to fuel level sensors implementing magnetic elements.

BACKGROUND

Fuel level sensors, such as those utilizing a float, are commonly used to determine fuel levels of a fuel tank. Such fuel level sensors often comprise sealed fuel level sensors, where particular components of a fuel level sensor are enclosed in a housing to prevent the components from being directly exposed to fuel of the fuel tank.

In many instances, however, implementations of fuel level sensors present reliability issues. For example, despite efforts, many sealed fuel level sensors suffer from leakage as a result of poor sealing, punctured housing, corrosion, or combinations thereof. As another example, many sealed fuel level sensors include mechanical components susceptible to wear, fatigue, and loosening. In either case, operation may be significantly compromised by these respective causes of failure.

SUMMARY OF THE INVENTION

According to one implementation, a sensor may include a sealed housing with a first end, a second end opposite thereto, and an interior defined by walls extending between the first and second ends. A float is arranged circumferentially around a portion of the sealed housing that rests on the surface of a fluid, such as fuel. The float is configured to move longitudinally along the sealed housing between the first and second ends. A magnetic or ferrous element is provided in or on the float. Within the sealed housing is an electrically conductive spring, which is coupled at least to the first or second end. Coupled to the spring is the other of the magnetic element or the ferrous element. As a result, the magnetic and ferrous elements are displaced relative to the sealed housing due to a magnetic field of the magnetic element interacting with the ferrous element. In response to this displacement, the electrically conductive spring expands and retracts thereby adjusting a resistance of the electrically conductive spring.

According to another implementation, an apparatus includes a control circuit configured to measure a resistance of a conductive path and a fuel sensor coupled to the control circuit and having a conductive path. The fuel sensor includes a balance spring, a variable resistance spring coupled in series with the balance spring, and one of a ferrous element or a magnetic element coupled to each of the balance spring and the variable resistance spring. The ferrous element or magnetic element is configured to apply a force to each of the balance spring and the variable resistance spring based on an applied magnetic force, and a resistance of the conductive path is based on the force applied to each of the balance spring and the variable resistance spring.

According to yet another implementation, a method of sensing fuel levels in a fuel tank involves sensing a resistance of a conductive path using a resistance sensor. The resistance sensor used in this method may include a sealed housing with a first end, a second end opposite the first end, an interior defined by walls extending therebetween, within which the conductive path is arranged. A float circumferentially surrounds an exterior of the sealed housing and is configured to move longitudinally along the exterior of the sealed housing between the first end and the second end. The float includes either a magnetic element or a ferrous element, and the sealed housing includes the other of the magnetic element or ferrous element within the interior, and a magnetic field between the magnetic element and the ferrous element is configured to adjust a resistance of the conductive path, which is indicative of a fuel level of the fuel tank. The method continues by translating the sensed resistance into the fuel level.

DETAILED DESCRIPTION

Apparatuses and methods for fuel level sensing are disclosed herein. Certain details are set forth below to provide a sufficient understanding of embodiments of the invention. However, it will be clear to one having skill in the art that implementations may be practiced with or without these particular details. Moreover, the particular embodiments of the present invention described herein are provided by way of example and should not be construed as limiting. In other instances, well-known components, circuits, and operations have not been shown in detail as being known to those of skill in the art.

The present disclosure is directed generally to fuel level sensors. A fuel level sensor may be a sensor located in a fuel tank and configured to provide one or more signals indicating fuel levels of the fuel tank. A fuel sensor may, for instance, include a conductive path having a resistance proportionate to the fuel level. That is, the greater the fuel level, the greater the resistance of the conductive path, and the lesser the fuel level, the lesser the resistance of the conductive path, or vice versa. The conductive path may be coupled to external control logic, which may be adapted to determine the resistance of the conductive path and translate the resistance into a fuel level.

Figure 1:
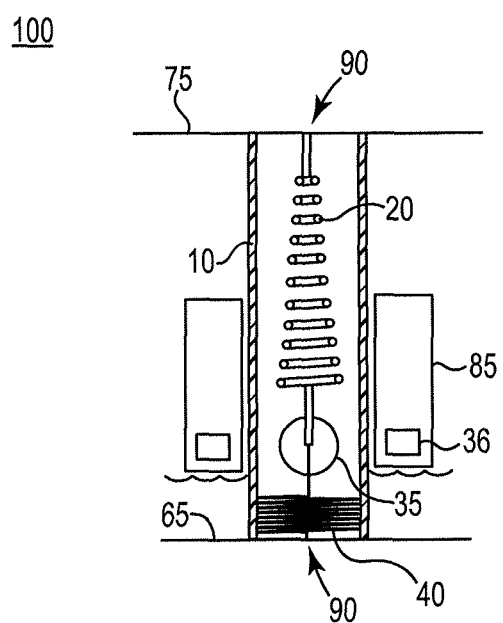
FIG. 1 is a diagram of a cross-sectional view of a fuel level sensor in a first position according to an embodiment of the present invention.

FIG. 1 is a diagram of a cross-sectional view of a fuel level sensor 100 in a first position according to one implementation. The fuel level sensor 100 includes a sealed housing 10, a coil spring 20, a ferrous element 35, a magnetic element 36, a balance spring 40, first and second connection caps 65, 75, a float 85 and a conductive path 90.

Each end of the sealed housing 10 may be sealed by a respective cap 65, 75 such that the sealed housing 10 is liquid tight. For instance, a first end of the sealed housing 10 may be sealed using a first connection cap 65 and a second end of the sealed housing 10 may be sealed using a second connection cap 75. Each of the connection caps 65, 75 may be sealed at a respective end of the sealed housing 10 using an adhesive, such as glue. The caps 65, 75 may be coupled (e.g., fixedly joined) to an interior of a fuel tank.

The sealed housing 10 may be substantially cylindrical in shape, or may have any other shape. In some embodiments, for instance, the sealed housing 10 may be hyper-rectangular or conical in shape and further may be curved in a vertical and/or horizontal direction. The sealed housing 10 may comprise any material known in the art, now or in the future, such as glass, plastic, metal, rubber, or any combination thereof, and accordingly may be configured to resist and/or mitigate corrosion from one or more liquid fuels.

In at least one example, the sealed housing 10 may be filled with a non-conductive fluid. In this manner, one or more components of the fuel level sensor 100 located in the housing 10 may be submersed and/or suspended in the non-conductive fluid. The non-conductive fluid may be an inert fluid, a dielectric fluid, or any combination thereof. In some implementations, the non-conductive fluid may serve to dampen or absorb forces within the sealed housing 10. In addition, the non-conductive fluid may extend the lifetime of the internal components of the sealed housing 10 by carrying debris away from the components so that movement of the components is not impeded by such debris, thereby mitigating wear and deterioration. In some instances, the sealed housing 10 may only be partially filled with the non-conductive fluid, and any portion of the sealed housing 10 not filled with the non-conductive fluid may be filled with an inert gas, such as argon or nitrogen.

Each of the coil spring 20, ferrous element 35, and balance spring 40 may be located within an interior of the sealed housing 10 and may be coupled in series between the connection caps 65, 75. For example, as illustrated in FIG. 1, the coil spring 20 may be coupled to the connection cap 75 and the ferrous element 35, the ferrous element 35 may further be coupled to the balance spring 40, and the balance spring 40 may further be coupled to the connection cap 65.

The coil spring 20 may be an electrically conductive spring and may be configured to expand and retract during operation of the fuel sensor 100. In some examples, the coil spring 20 may comprise a spring resistor (e.g., variable spring resistor) and have a resistance that varies according to the expansion and retraction of the coil spring 20. For example, as the coil spring 20 is expanded, an increasing number of the coils (e.g., windings) of the coil spring 20 may be separated, resulting in a longer electrical path from end to end of the coil spring 20, and thus an increased resistance. As the coil spring is retracted, an increasing number of the coils of the coil spring 20 may be electrically coupled, resulting in a shorter electrical path from end to end of the coil spring 20, and thus a decreased resistance. In at least one embodiment, the resistance of the coil spring 20 may change linearly (e.g., proportionately) with respect to expansion and retraction. In other embodiments, the resistance of the coil spring 20 may change exponentially, or in another other manner.

The coil spring 20 may be substantially conical in shape such that respective circumferences of windings change over a length of the coil spring 20. In at least one embodiment, the conical shape of the coil spring 20 may taper toward the connection cap 75. Accordingly, as the coil spring 20 expands and retracts during operation, coils of the coil spring 20 may be separated substantially uniformly. In another embodiment, the conical shape of the coil spring 20 may taper toward the connection cap 65. While the coil spring is described as having a conical shape, a spring having any shape and/or any tension may be used to implement the coil spring 20. In some examples, the coil spring may comprise stainless steel, nickel chrome alloys, or a combination thereof.

Figure 2:
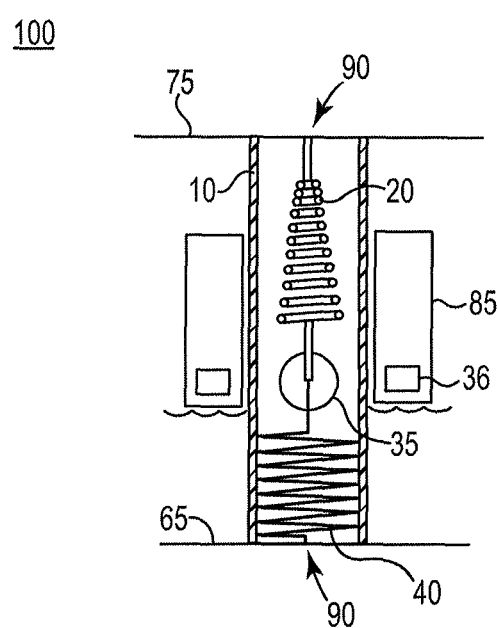
FIG. 2 is a diagram of a cross-sectional view of a fuel level sensor in a second position according to an embodiment of the present invention.
Figure 3:
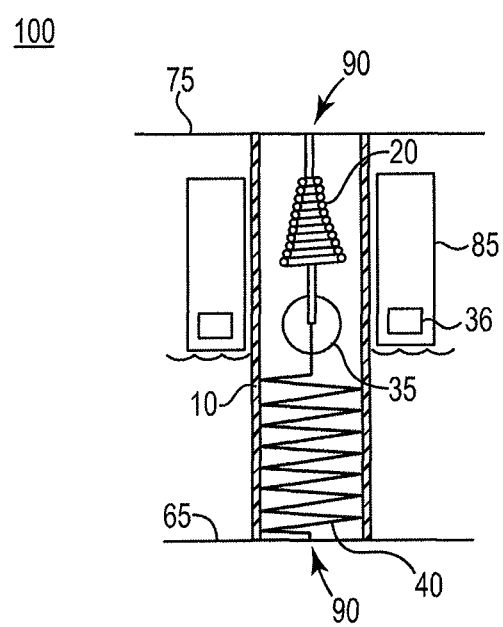
FIG. 3 is a diagram of a cross-sectional view of a fuel level sensor in a third position according to an embodiment of the present invention.

The ferrous element 35 may comprise any ferromagnetic or ferrous material, such as iron or nickel, and/or any other material having magnetic properties. The ferrous element 35 may have any shape and accordingly, may be spherical, hyper-rectangular, ellipsoidal, or any combination thereof. The ferrous element 35 may be arranged within the sealed housing 10 as shown in FIGS. 1-3. Alternatively, the ferrous element 35 may alternatively be arranged in or on the external float 85 in embodiments where the magnetic element is arranged within the sealed housing 10. In this alternative embodiment, the ferrous element 35 may comprise a ring-shaped magnet, or "donut magnet."

The magnetic element 36 may comprise any magnet known in the art, now or in the future, and may have any shape. For example, because the float 85 may circumferentially enclose at least a portion of the sealed housing 10, in some examples the magnetic element 36 may comprise a ring-shaped magnet, or "donut magnet." In other examples, the magnetic element 36 may comprise one or more arc-shaped magnets, horseshoe magnets, bar magnets, or any combination thereof. Alternatively, where the ferrous element is arranged in or on the external float 85, the magnetic element 36 may be arranged within the sealed housing 10 and may have any shape such as spherical, hyper-rectangular, ellipsoidal, or any combination thereof.

The magnetic element 36 may be configured to provide a magnetic field and accordingly may be configured to magnetically interact with the ferrous element 35. By way of example, the magnetic element 36 may be configured to provide a magnetic field to apply a magnetic force to the ferrous element 35 and thereby attract the ferrous element 35 to the magnetic element 36.

As shown in FIGS. 1-3, as the magnetic element 36 arranged in or on the external float 85 changes position in response to changes in fuel level of a fuel tank, the ferrous element 35 may change position within the sealed housing 10. In this manner, the ferrous element 35 may apply a force to the coil spring 20 and the coil spring 20 may be expanded and retracted by the ferrous element 35 to decrease and increase the resistance of the coil spring 20, respectively. Alternatively, the ferrous element 35 may be arranged in or on the external float 85 and the magnetic element 36 may be arranged within the sealed housing 10, and as the fuel level changes position, the position of the external float 85 changes correspondingly, resulting movement of the ferrous element 35, which slaves the magnetic element 36 within the sealed housing 10 to move, thereby resulting in the magnetic element causing the resistance in the coil spring 20 to change.

The balance spring 40 may be configured to expand and retract during operation of the fuel sensor 100 and may, for instance, have a relatively high modulus. The balance spring 40 may expand and retract in a complementary manner of that of the coil spring 20. In this manner, the balance spring 40 may compensate for displacement of the ferrous element 35 relative to the housing 10 during operation. In some implementations, the balance spring 40 may be an electrically conductive spring, described further below.

The external float 85 may comprise any float known in the art, now or in the future, and may be configured to enclose (e.g., circumferentially enclose) at least a portion of the housing 10. In this manner, the float 85 may be slidably joined to the sealed housing 10 and configured to move (e.g., slide) longitudinally along the sealed housing 10 between each of the caps 65, 75 during operation. Because in some examples, each of the caps 65, 75 may be configured to radially extend beyond walls of the sealed housing 10 in one or more directions (recall that the sealed housing 10 may comprise a cylinder), the float 85 may be configured to only slide along the sealed housing 10 between the caps 65, 75.

Briefly, the float 85 may be configured to change in position responsive to changes in fuel level of the fuel tank. By way of example, the float 85 may be configured to be buoyant when submersed in fuel such that the float 85 rises and falls with the fuel level of the fuel tank. Because the float 85 may include the magnetic element 36 or the ferrous element 35, the magnetic element 36 or the ferrous element 35 may be configured to rise and fall with the fuel level of the fuel tank as well.

The fuel level sensor 100 may include a conductive path 90 for electrically coupling the fuel level sensor 100 to external control logic of the fuel sensor. The conductive path 90 may be defined by electrically conductive components extending from an interior of the sealed housing 10 to an exterior of the housing. In some examples, the ferrous element 35 or the magnetic element 36 when arranged within the sealed housing 10 may be configured to electrically couple the coil spring 20 and the balance spring 40 to form at least a portion of the conductive path 90. For example, the ferrous element 35 may be electrically conductive and configured to electrically couple the coil spring 20 and the balance spring 40 to define at least a portion of the conductive path 90. Alternatively, the coil spring 20 and the balance spring 40 may be electrically coupled directly, or by one or more wires routed through and/or around the ferrous element 35, in order to define at least a portion of the conductive path 90. Furthermore, each of the connection caps 65, 75 may be conductive and configured to define at least a portion of the conductive path 90 by acting as an electrical terminal of the fuel level sensor 100. In some examples, the connection cap 65 may include a wire coupled to the balance spring 40 and extend out of the sealed housing 10 through the connection cap 55. Similarly, the connection cap 75 may include a wire coupled to the coil spring 20 and extend out of the sealed housing 10 through the connection cap 75. Thus, the conductive path 90 may be formed between each of the caps 65, 75 via the coil spring 20, the ferrous element 35 or magnetic element 36, and the balance spring 40; or alternatively, the conductive path 90 may be formed between the caps 65, 75 via the coil spring 20 and the balance spring 40. Because each of the caps 65, 75 may include a wire extending out of the sealed housing 10, the conductive path 90 may be accessible to one or more external circuits. Moreover, because the ferrous element 35 or magnetic element 36 may apply a force to the coil spring 20 during operation, the resistance of the conductive path 90 may be adjusted as the coil spring 20 expands and retracts. Briefly, a range of fuel levels in the fuel tank may therefore correspond to a range of resistances of the conductive path 90, and more specifically, to a range of resistances of the coil spring 20.

While the conductive path 90 of fuel level sensor 100 has been described as including caps 65, 75, coil spring 20 and balance spring 40, alone or in combination with the ferrous element 35 or the magnetic element 36, it will be appreciated that in some embodiments one or more components of the conductive path 90 may be omitted and/or one or more components may be added to the conductive path 90. For example, in one embodiment, the balance spring 40 may be omitted such that the ferrous element 35 is coupled to the connection cap 75 directly and/or using a wire. In another embodiment, the conductive path 90 may include one or more resistors to increase the overall resistance. In another example, the conductive path 90 may be provided at either one of the caps 65, 75, in which the coil spring 20 and optionally the balance spring 40 and/or ferrous element 35 may be electrically coupled to one of the caps 65, 75 via two conductive leads extending therefrom. For example, a first conductive lead may extend from one end of the coil spring and a second conductive lead may extend from another, opposite end of the coil spring and the leads may electrically couple to one of the caps 65, 75.

In operation, the fuel level sensor 100 may generally be used to determine a fuel level in a fuel tank. In an example operation of the fuel level sensor 100, a fuel level of a fuel tank may be at a particular level, and as described, the external float 85 may be at a particular height in the fuel tank based on the external float 85 floating on the fuel surface. Because the external float 85 includes the magnetic element 36, the magnetic element 36 may also be at a particular height in the fuel tank based on the fuel level. The magnetic element 36 may provide a magnetic force, causing the ferrous element 35 within the sealed housing 10 to be pulled toward the magnetic element 36, and in turn, the ferrous element may provide a force to the coil spring 20 to extend the coil spring 20 a particular amount and thereby determine the resistance of the coil spring 20. An external circuit coupled to one or both of the caps 65, 75 of the fuel level sensor 100 may determine the resistance of the conductive path 90 and based on the resistance of the conductive path 90, determine the fuel level. In some examples, the external circuit may determine the resistance of the coil spring 20 from the resistance of the conductive path 90 and determine the fuel level from the resistance of the coil spring 20.

As the fuel level of the fuel tank changes, the position of the external float 85 may change as the external float 85 slides along the sealed housing 10 between the caps 65, 75. This displacement of the external float 85 may change the position of the magnetic element 36 relative to the sealed housing 10 and cause displacement of the ferrous element 36 within the sealed housing 10. The change in position of the ferrous element 35 may adjust the force applied to the coil spring 20 and in turn adjust the resistance of the coil spring 20 by expanding or retracting the coil spring 20. As one or both of the caps 65, 75 may be coupled to an external circuit, described above, the resistance of the conductive path 90 may be used to determine the new fuel level of the fuel tank.

With reference to FIG. 1, the fuel level sensor 100 is shown in a position in an instance in which a fuel tank has a low fuel level (e.g., the fuel tank is empty or near empty). Due to the low fuel level, the external float 85 may be located relatively near or adjacent the cap 65 of the fuel sensor 100, and as a result, the ferrous element 35 may also be located near the connection cap 65 at a first end due to the magnetic force provided by the magnetic element 36 of the float 85. Consequently, a high force may be applied to the coil spring 20 by the ferrous element 35. The coil spring 20 may be in an expanded state where most or all of the coils of the coil spring 20 are separated and further may have a relatively high resistance.

With reference to FIG. 2, the fuel level sensor 100 is shown in a position in an instance in which a fuel tank has a moderate fuel level (e.g., the fuel tank is approximately half full). Due to the moderate fuel level, the float 85 may be relatively centered between the caps 65, 75, and as a result, the ferrous element 35 may also be relatively centered between the caps 65, 75 due to the magnetic force provided by the magnetic element 36. Consequently, a moderate force may be applied to the coil spring 20 by the ferrous element 35. The coil spring 20 may be in a moderately expanded state where a portion of the coils of the coil spring 20 are separated and further may have a moderate resistance.

With reference to FIG. 3, the fuel level sensor 100 is shown in a position in an instance in which a fuel tank has a high fuel level (e.g., the fuel tank is near full or full). Due to the high fuel level, the float 85 may be located near or adjacent the second end of the fuel sensor 100, and as a result, the ferrous element 35 may also be located near the second end due to the magnetic force provided by the magnetic element 36 of the float 85. Consequently, a low force may be applied to the coil spring 20 by the ferrous element 35. The coil spring 20 may be in a retracted state where most or all of the coils of the coil spring 20 are electrically coupled and further may have a relatively low resistance.

According to alternative implementations, the arrangement of the coil spring 20 and balance spring 40 may be reversed compared to their arrangement shown in FIGS. 1-3, and the coil spring 20 may join to the connection cap 65 and the balance spring 40 may join to the connection cap 75. Consequently, although movement of the ferrous element 35 results in movement of the coil spring 20 and the balance spring 40, as the ferrous element 35 moves towards the connection cap 65 (e.g., in response to the magnetic element 36 moving toward the connection cap 65), a retraction force may be applied to the coil spring 20 as the windings of the coil spring 20 retract or relax towards the connection cap 65 resulting in a relatively low resistance. In this alternative arrangement, as the ferrous element 35 moves towards the connection cap 65, an expansion force may be applied to the balance spring 40 causing the windings of the balance spring 40 to expand. Although not described in detail, this alternative arrangement of components within the sealed housing 10 may enable sensing of fuel levels within a fuel tank using a reverse approach compared to the approach described in connection with FIGS. 1-3, and in this alternative arrangement, high fuel levels may correspond to relatively low resistance readings, moderate fuel levels may correspond to relatively moderate resistance readings, and low fuel levels may correspond to relatively high resistance readings.

Figure 4:
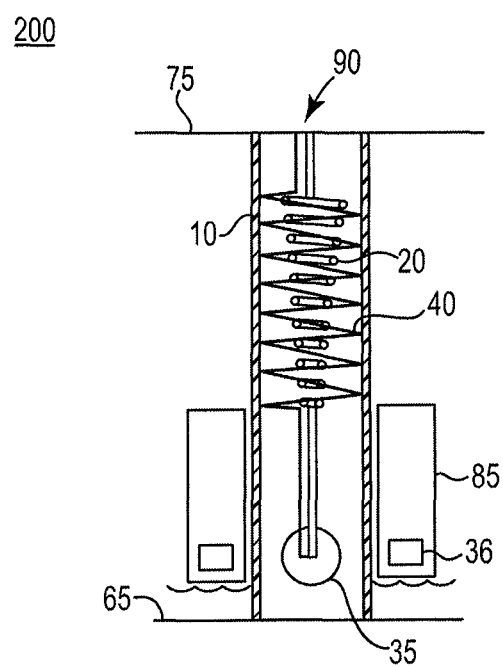
FIG. 4 is a diagram of a cross-sectional view of a fuel level sensor in a first position according to another embodiment of the present invention.

Examples directed to the conductive path 90 have been described herein as including the coil spring 20, ferrous element 35 or magnetic element 36, and balance spring 40 coupled in series. In some examples, a coil spring may be arranged coaxially relative to the balance spring 40. Accordingly, FIG. 4 is a diagram of a cross-sectional view of a fuel level sensor 200 in a first position according to another implementation of the present disclosure. The fuel level sensor 200 includes elements that have been previously described with respect to the fuel level sensor 100 of FIGS. 1-3. Those elements have been shown in FIGS. 4-6 using the same reference numbers used in FIGS. 1-3 and operation of the common elements is as previously described unless otherwise specified.

As illustrated in FIG. 4, the coil spring 20 and balance spring 40 may be coupled (e.g., in series) at a "coupling point" and one or more of the coil spring 20 and the balance spring 40 may further be coupled to the ferrous element 35 at or near the coupling point. The remaining ends of each of the coil spring 20 and the balance spring 40 may be coupled to the connection cap 75. In some examples, the coil spring 20 may be coaxially arranged within the balance spring 40. In other examples, the coil spring 20 may be coaxially arranged outside of the balance spring 40.

As described in further detail below, the coil spring 20 and the balance spring 40 may form at least a portion of a conductive path 90. Accordingly, in some examples, the coil spring 20 and the balance spring 40 may be configured to be electrically isolated from one another except at the coupling point, e.g., at the ferrous element 35. For example, the coil spring 20 and the balance spring 40 may be spaced apart coaxially such that, save for the coupling point, neither spring 20, 40 physically contacts the other despite any expansion or retraction of either the coil spring 20 and the balance spring 40 during operation. In another embodiment, a layer comprising dielectric material may be located between the coil spring 20 and the balance spring 40.

Because the ferrous element 35 may be coupled to the coil spring 20 and/or the balance spring 40 at the coupling point, in response to a magnetic force provided by the magnetic element 36 directed toward the connection cap 75, the ferrous element 35 may move toward the connection cap 75 and the ferrous element 35 may apply a corresponding compression force to the coil spring 20 and the balance spring 40 to retract the coil spring 20 and/or the balance spring 40 toward the connection cap 75. In some examples, increasing the force applied to the balance spring 40 in this manner may further relax the balance spring. In response to a magnetic force provided by the magnetic element 36 toward the connection cap 65, the ferrous element 35 may move toward the connection cap 65 and the ferrous element 35 may apply a corresponding expansion force to the coil spring 20 and the balance spring 40 to expand the coil spring 20 and/or the balance spring 40 toward the connection cap 65. As described, the magnetic element 36 of the float 85 may move longitudinally relative to the sealed housing 10, and as the magnetic element 36 is moved, the magnitude of the compression force applied by the ferrous element 35 may be adjusted. By way of example, the more the ferrous element 35 is pulled proximate the connection cap 65, the greater the force applied by the ferrous element 35, and conversely, the more the ferrous element 35 is pulled proximate the connection cap 75, the lesser the force applied by the ferrous element 35. In this manner, both the coil spring 20 and the balance spring 40 may be expanded and retracted by the ferrous element 35. As a result, the resistance of the coil spring 20 may be decreased and increased, respectively.

The connection cap 75 may be conductive and/or may include electric terminals coupled to each of the coil spring 20 and the balance spring 40, respectively. For example, the connection cap 75 may include wires coupled to the coil spring 20 and balance spring 40, respectively, and extending out of the sealed housing 10 through the connection cap 75. Thus, the conductive path 90 may be formed between terminals of the connection cap 75, via a first terminal, the coil spring 20, the balance spring 40, and a second terminal. Because the connection cap 75 may include wires extending out of the sealed housing 10, the conductive path 90 may be accessible to one or more external circuits. Moreover, because the ferrous element 35 may apply a force during operation, the resistance of the conductive path 90 may be adjusted as the coil spring 20 expands and retracts. Briefly, a range of fuel levels in the fuel tank may therefore correspond to a range of resistances of the conductive path 90, and more specifically, to a range of resistances of the coil spring 20

While the conductive path 90 of fuel level sensor 200 has been described as including connection cap 75, coil spring 20, and balance spring 40, it will be appreciated that in some embodiments one or more components of the conductive path 90 may be omitted and/or one or more components may be added to the conductive path 90.

In operation, the fuel level sensor 200 may generally be used to determine a fuel level in a fuel tank. In an example operation of the fuel level sensor 200, a fuel level of a fuel tank may be at a particular level, and as described, the float 85 may be at a particular height of the fuel tank based on the float 85 floating on the fuel surface. Because the float 85 includes the magnetic element 36, the magnetic element 36 may also be at a particular height of the fuel tank based on the fuel level. The magnetic element 36 may provide a magnetic force, causing the ferrous element 35 to be pulled toward the magnetic element 36, and in turn, the ferrous element 35 may move toward the magnetic element 36 and provide a force to the coil spring 20 to extend the coil spring 20 a particular amount and thereby determine the resistance of the coil spring 20. An external circuit coupled to terminals of the connection cap 75 of the fuel level sensor 200 may determine the resistance of the conductive path 90 between the terminals of the connection cap 75 and based on the resistance of the conductive path 90 may determine the fuel level. In some examples, the external circuit may determine the resistance of the coil spring 20 from the resistance of the conductive path 90 and determine the fuel level from the resistance of the coil spring 20.

As the fuel level of the fuel tank changes, the height of the float 85 may change as the float 85 slides along the sealed housing 10 between the caps 65, 75. This displacement of the float 85 may change the position of the magnetic element 36 relative to the sealed housing 10 and cause displacement of the ferrous element 36 within the sealed housing 10. The change in position of the ferrous element 35 may adjust the force applied to the coil spring 20 and in turn adjust the resistance of the coil spring 20 by expanding or retracting the coil spring 20. As terminals of the connection cap 75 may be coupled to an external circuit, described above, the resistance of the conductive path 90 may be used to determine the new fuel level of the fuel tank.

With reference to FIG. 4, the fuel level sensor 200 is shown in a position in an instance in which a fuel tank has a low fuel level (e.g., the fuel tank is empty or near empty). Due to the low fuel level, the float 85 may be located near or adjacent the connection cap 65 of the fuel sensor 100, and as a result, the ferrous element 35 may also be located near the connection cap 65 at a first end due to the magnetic force provided by the magnetic element 36 of the float 85. Consequently, a high force may be applied to the coil spring 20 by the ferrous element 35. The coil spring 20 may be in an expanded state where most or all of the coils of the coil spring 20 are separated and further may have a relatively high resistance.

Figure 5:
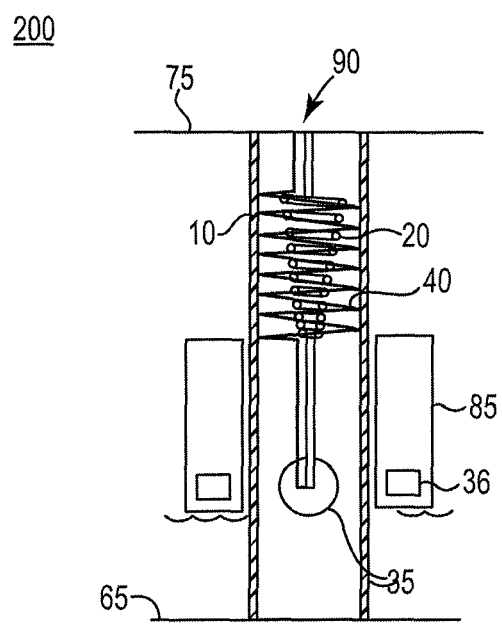
FIG. 5 is a diagram of a cross-sectional view of a fuel level sensor in a second position according to the another embodiment of the present invention.

With reference to FIG. 5, the fuel level sensor 200 is shown in a position in an instance in which a fuel tank has a moderate fuel level (e.g., the fuel tank is approximately half full). Due to the moderate fuel level, the float 85 may be relatively centered between the caps 65, 75, and as a result, the ferrous element 35 may also be relatively centered between the caps 65, 75 due to the magnetic force provided by the magnetic element 36. Consequently, a moderate force may be applied to the coil spring 20 by the ferrous element 35. The coil spring 20 may be in a moderately expanded state where a portion of the coils of the coil spring 20 are separated and further may have a moderate resistance.

Figure 6:
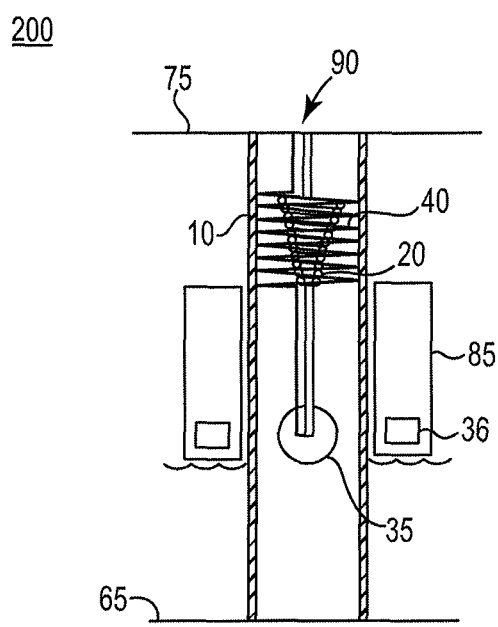
FIG. 6 is a diagram of a cross-sectional view of a fuel level sensor in a third position according to the another embodiment of the present invention.

With reference to FIG. 6, the fuel level sensor 200 is shown in a position in an instance in which a fuel tank has a high fuel level (e.g., the fuel tank is near full or full). Due to the high fuel level, the float 85 may be located near or adjacent the second end of the fuel sensor 100, and as a result, the ferrous element 35 may also be located near the second end due to the magnetic force provided by the magnetic element 36 of the float 85. Consequently, a low force may be applied to the coil spring 20 by the ferrous element 35. The coil spring 20 may be in a retracted state where most or all of the coils of the coil spring 20 are electrically coupled and further may have a relatively low resistance.

According to alternative implementations, the coil spring 20 and balance spring 40 may be coupled as described above in connection with FIGS. 4-6, and each may join at one end to the ferrous element 35 at or near the coupling point, but the other end of each of the coil spring 20 and the balance spring 40 couple to the connection cap 65 instead of joining to the connection cap 75 as with FIGS. 4-6. Thus, one end of each of the springs 20, 40 joins to the connection cap 65 of the fuel level sensor 200. Consequently, because the movement of the ferrous element 35 results in movement of the coil spring 20 and balance spring 40, as the ferrous element 35 moves towards the connection cap 75 (e.g., in response to the magnetic element 36 moving toward the connection cap 75), the ferrous element 35 may apply a corresponding expansion force to the coil spring 20 and the balance spring 40 to expand the coil spring 20 and/or the balance spring 40 resulting in a change in resistance, particularly an increase in resistance due to the windings of the coil spring separating. The connection cap 65 may be configured similarly to the connection cap 75, particularly as described in connection with FIGS. 4-6, and may be conductive and/or may include electric terminals coupled to each of the coil spring 20 and the balance spring 40, respectively, to form the conductive path 90 for joining to a sensor externally arranged relative to the sealed housing 10. This alternative arrangement of the fuel level sensor components within the sealed housing 10 may enable sensing of fuel levels within a fuel tank using a reverse approach compared to the approach described in connection with FIGS. 4-6, and in this alternative arrangement, high fuel levels may correspond to relatively high resistance readings, moderate fuel levels may correspond to relatively moderate resistance readings, and low fuel levels may correspond to relatively low resistance readings.

From the foregoing it will be appreciated that, although specific embodiments of the present disclosure have been described herein for purposes of illustration, various modifications may be made without deviating from the spirit and scope of the present disclosure. Accordingly, the invention is not limited except as by the appended claims.

What is claimed is:

1. A sensor, comprising:
a sealed housing comprising a first end, a second end opposite the first end, and an interior defined by walls extending therebetween; and
a float arranged circumferentially around a portion of the sealed housing and configured to move longitudinally along the sealed housing between the first and second ends, the float comprising one of a magnetic element or a ferrous element,
wherein the sealed housing comprises:
an electrically conductive spring, the electrically conductive spring coupled to at least one of the first end or the second end; and
the other of the magnetic element or the ferrous element, which is coupled to the electrically conductive spring and configured to be displaced relative to the sealed housing based on a magnetic field of the magnetic element interacting with the ferrous element, and wherein the electrically conductive spring is further configured to expand and retract to adjust a resistance of the electrically conductive spring in response to displacement of the magnetic element or the ferrous element relative to the sealed housing.

2. The sensor of claim 1, wherein the float is configured to move longitudinally along the sealed housing based on a fuel level of a fuel tank.

3. The sensor of claim 1, wherein the sealed housing further comprises a balance spring coupled to at least one of the first or second ends.

4. The sensor of claim 3, wherein the electrically conductive spring is coaxially arranged relative to the balance spring.

5. The sensor of claim 3, wherein the balance spring is electrically conductive and coupled to the electrically conductive spring.

6. The sensor of claim 5, wherein the first and second ends each comprise a connection cap, at least one of the connection caps configured to provide a conductive path including the balance spring and the electrically conductive spring.

7. The sensor of claim 1, wherein windings of the coil spring define a conical shape.

8. An apparatus, comprising:
a control circuit configured to measure a resistance of a conductive path;
a fuel sensor coupled to the control circuit and having a conductive path, the fuel sensor comprising:
a balance spring;
a variable resistance spring coupled in series with the balance spring; and
one of a ferrous element or a magnetic element coupled to each of the balance spring and the variable resistance spring, the one of the ferrous element or magnetic element configured to apply a force to each of the balance spring and the variable resistance spring based on a magnetic force applied to the one of the ferrous element or magnetic element, wherein the magnetic force is applied between an external float comprising the other of the ferrous element or magnetic element,
wherein a resistance of the conductive path is based on the force applied to each of the balance spring and the variable resistance spring.

9. The fuel sensor of claim 8, wherein the balance spring is coupled to a first end of the fuel sensor and the variable resistance spring is coupled to a second end of the fuel sensor.

10. The fuel sensor of claim 8, wherein the variable resistance spring comprises a series of windings having a conical shape.

11. The fuel sensor of claim 8, wherein the ferrous element comprises a ferrous material of one of iron, nickel, or a combination thereof.

12. The fuel sensor of claim 8, wherein the variable resistance spring is coaxially arranged relative to the balance spring.

13. The fuel sensor of claim 12, wherein each of the variable resistance spring and the balance spring are coupled to a first end of the fuel sensor.

14. A method of sensing fuel levels in a fuel tank, the method comprising:
sensing a resistance of a conductive path using a resistance sensor, the resistance sensor comprising:
a sealed housing comprising a first end, a second end opposite the first end and an interior defined by walls extending therebetween, wherein the conductive path is arranged within the interior of the sealed housing; and
a float circumferentially surrounding an exterior of the sealed housing and configured to move longitudinally along the exterior of the sealed housing between the first end and the second end, the float comprising one of a magnetic element or a ferrous element, wherein the sealed housing comprises the other of the magnetic element or ferrous element within the interior, and wherein a magnetic field between the magnetic element and the ferrous element is configured to adjust a resistance of the conductive path, the resistance indicative of a fuel level of the fuel tank, wherein the conductive path comprises first and second springs coupled in series and the other of the magnetic element or ferrous element within the interior of the sealed housing; and
translating the resistance into the fuel level.

15. The method of claim 14, wherein the first and second springs are coaxially arranged relative to one another.

* * * * *